(12) United States Patent
Hughes, Jr. et al.

(10) Patent No.: US 7,248,586 B1
(45) Date of Patent: Jul. 24, 2007

(54) PACKET FORWARDING THROUGHPUT WITH PARTIAL PACKET ORDERING

(75) Inventors: John H. Hughes, Jr., San Jose, CA (US); Hema Kapadia, Mountain View, CA (US); Rajiv Kane, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 995 days.

(21) Appl. No.: 10/034,609

(22) Filed: Dec. 27, 2001

(51) Int. Cl.
*H04L 12/28* (2006.01)

(52) U.S. Cl. ....................................... 370/394

(58) Field of Classification Search ............... 370/394, 370/401, 428, 412, 423, 414, 392, 389, 413
See application file for complete search history.

(56) References Cited

U.S. PATENT DOCUMENTS

| | | | |
|---|---|---|---|
| 6,308,219 B1 | 10/2001 | Hughes | 709/238 |
| 6,351,454 B1 | 2/2002 | Crocker et al. | 370/235 |
| 6,560,237 B1 | 5/2003 | Hiscock et al. | 370/412 |
| 6,581,116 B1 | 6/2003 | Arimilli et al. | 710/110 |
| 6,633,575 B1 | 10/2003 | Koodli | 370/412 |
| 6,687,247 B1 * | 2/2004 | Wilford et al. | 370/392 |
| 6,862,282 B1 | 3/2005 | Oden | 370/394 |
| 6,862,283 B2 | 3/2005 | Marietta et al. | 370/394 |
| 6,876,657 B1 * | 4/2005 | Brewer et al. | 370/394 |
| 6,909,713 B2 * | 6/2005 | Magnussen et al. | 370/389 |
| 6,975,629 B2 * | 12/2005 | Welin | 370/392 |
| 7,016,367 B1 * | 3/2006 | Dyckerhoff et al. | 370/429 |

* cited by examiner

*Primary Examiner*—Chi Pham
*Assistant Examiner*—Alexander O. Boakye
(74) *Attorney, Agent, or Firm*—Campbell Stephenson Ascolese LLP

(57) ABSTRACT

The present invention describes a system and method of improving packet forwarding throughput in a router by reducing head of line blocking. In one embodiment of the present invention, incoming packets are stored in a packet reorder buffer. The packets are reordered for forwarding while maintaining the order of packets in a distinct flow. Packets belonging to a distinct flow require to be forwarded in the order that the router receives them. Packets from different flows are reordered such that their forwarding order can be different than the order in which they were received. Packets from the same flow are sent out in the same order as the router receives them.

71 Claims, 7 Drawing Sheets

PACKET FORWARDING THROUGHPUT WITH PARTIAL PACKET ORDERING

BACKGROUND OF THE INVENTION

1. Field of the Invention

The present invention relates to packet switching and routing systems, specifically to packet forwarding techniques.

2. Description of the Related Art

Routing lookup decisions are a well-known component of the modern routing and switching functions implemented in data communications networks. The routing lookups performed on Internet Protocol (IP) addresses and multi-protocol label switching (MPLS) labels often have varying latencies (or delays) associated in returning results. For example, most IP lookups require two accesses of the routing table to determine a destination address for the next hop. However, certain types of MPLS lookups, including virtual private network (VPN) lookups may require as many as seven accesses of the routing table.

Some modern routing/switching systems also employ a cache to speed the lookup function by storing certain addresses (such as, for example, frequently-encountered, high priority destinations or the like). When an IP destination address is presented for lookup, that address is first compared against the contents of the cache. If that IP address is found in the cache, the system bypasses the potentially lengthy lookup process. In systems employing the cache, packets (either plain IP packets or MPLS labeled packets) can transit the lookup sequence quickly. Thus, depending on the type of packet and whenever a cache hit occurs, packets arriving at the router may experience a variety of latencies in proceeding through the lookup process.

In today's environment of increasing network speeds, it is desirable to eliminate as many sources of routing delay as possible. The lookup throughput is different for different data traffic thus limiting attempts of eliminating latency in the lookup process. This is because the current router and switching systems do not distinguish between different incoming packet flows. At the end of a routing lookup, all packets are collected in a first-in-first-out (FIFO) buffer and are sent forward for further processing in the order that the packets were received.

The use of a single FIFO buffer can result in a head-of-line (HOL) blocking problem. The HOL blocking problem arises when several packets, for which the IP lookup has been completed, must wait behind a single packet at the head of the line whose lookup is still in process. For example, consider an MPLS packet arriving first, followed by several short IP packets, the destination addresses of which result in cache hits. The IP packets can bypass the lookup process by employing the cache. However, these IP packets must wait in the FIFO buffer until the lengthy lookup for the first MPLS packet at the head of the line is completed. Thus the head-of-line blocking problem can result in a loss of overall packet forwarding throughput in the router. What is needed is a system and method for improving packet-forwarding throughput by reducing or eliminating the head-of-line blocking problem.

SUMMARY

The present invention describes a method for routing packets in a router. The method includes receiving multiple packets in a first order, storing the packets in a packet reorder buffer, and forwarding the packets in a second order from the packet reorder buffer. The method further includes determining multiple hash values using information contained in the packets, storing the hash values in the packet reorder buffer, and using the hash values to determine the second order. In one embodiment of the present invention, a first subset of the multiple packets having a common hash value is forwarded in an order in which the first subset is received by the router.

The method further includes setting a status of the multiple packets in the packet reorder buffer to 'not-ready'. The method further includes selecting a 'head of line' packet from the packet reorder buffer, the 'head of line' packet is a packet that is stored in the packet reorder buffer for longest period of time, and identifying the 'head of line' packet using a 'head of line' pointer. The method further includes locating a routing information for the multiple packets in a cache, if the routing information is not located in the cache, locating the routing information in a lookup table, and when the routing information is located, setting the status of the multiple packets in the packet reorder buffer to 'ready'.

The method further includes selecting a first packet with a 'ready' status from the packet reorder buffer and determining whether the first packet is 'head of line' packet. The method further includes if the first packet is 'head of line' packet, removing the first packet from the packet reorder buffer, forwarding the first packet, and if the packet reorder buffer is not empty, moving the 'head of line' pointer to one of the multiple packets that is stored for longest period of time in the packet reorder buffer. The method further includes if the first packet is not the 'head of line' packet, locating the 'head of line' packet in the packet reorder buffer, determining whether the first packet and the 'head of line' packet have a common hash value, and if the first packet and the 'head of line' packet have a common hash value, selecting a second packet with a 'ready' status from the packet reorder buffer.

The method further includes if the first packet and the 'head of line' packet do not have a common hash value, identifying a second subset of the multiple packets having a common hash value with the first packet from the packet reorder buffer, determining whether the first packet is stored for longest period of time in the packet reorder buffer among the second subset of packets, and if the first packet is not stored for longest period of time in the packet reorder buffer among the second subset of packets, selecting a third packet with a 'ready' status from the packet reorder buffer. The method further includes if the first packet is stored for longest period of time among the second subset of packets in the packet reorder buffer, determining whether a predetermined number of packets have been forwarded ahead of the 'head of line' packet from the packet reorder buffer.

The method further includes if a predetermined number of packets have not been forwarded ahead of the 'head of line' packet from the packet reorder buffer, forwarding the first packet. The method further includes if the predetermined number of packets have been forwarded ahead of the 'head of line' packet from the packet reorder buffer, generating an error, and waiting until the 'head of line' packet is forwarded. In one embodiment of the present invention, the head-of-line packet is forwarded before the routing information for the 'head of line' packet is located The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawing.

DETAILED DESCRIPTION OF THE INVENTION

The following is intended to provide a detailed description of an example of the invention and should not be taken to be limiting of the invention itself. Rather, any number of variations may fall within the scope of the invention which is defined in the claims following the description.

Introduction

The present invention describes a system and method of improving packet forwarding throughput in a router by reducing head-of-line (HOL) blocking. In one embodiment of the present invention, incoming packets are stored in a packet reorder buffer. The packets are reordered for forwarding, while maintaining the order of packets in a distinct data flow set. Data flow sets may be defined by any of several means well known in the art (i.e., e.g., classifying the packets by source address, destination address, source port, destination port, protocol used and the like or a combination thereof). Packets belonging to a distinct data flow should be forwarded in the order that the router receives them. Packets from different flows can be reordered such that their forwarding order can be different than the order in which they were received. Packets from the same data flow are sent out in the same order as the router receives them.

Packet Reorder Buffer

Initially, when a router receives packets, the packets are stored in a packet reorder buffer while the lookup function processes routing information. Once the lookup is completed, packets from the reorder buffer can be processed for forwarding. The packets can be forwarded in a different order than they were received. However, packets from a flow set are forwarded in the same order that they are received. Once the flow set is classified using any of the aforementioned means (i.e., e.g., destination address or the like), the classification is used by the router to identify incoming packets. The router stores the classification of each packet in the packet reorder buffer. The packets belonging to a particular flow set in the packet reorder buffers are identified using the classification. The classification of the flow set can be hashed into a smaller set of possible values. The hashed value of the classification can be used to identify packets in a specific flow set. A variety of hash functions can be used and the process of decimating a larger space by hashing are well known in the art.

Figure 1:
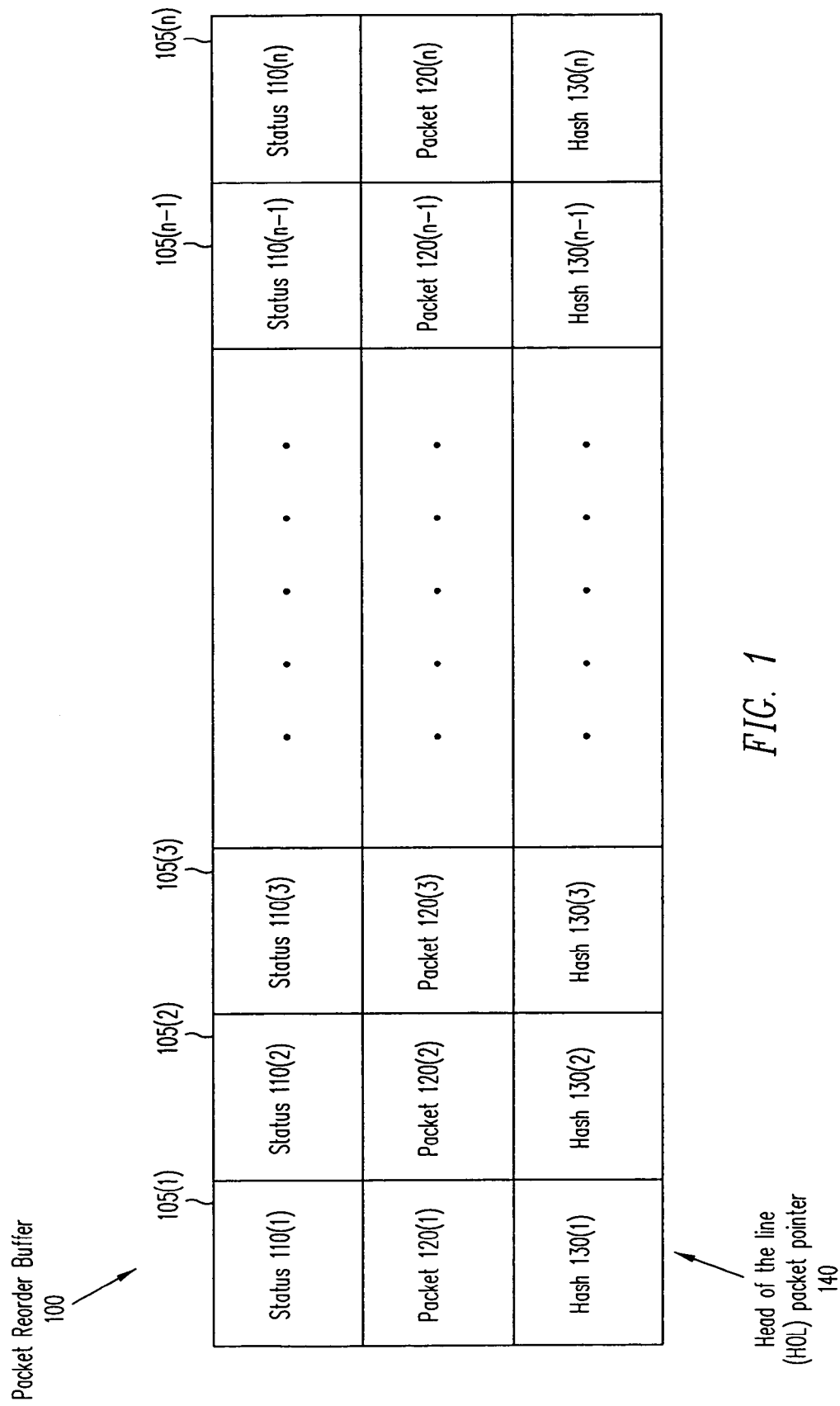
FIG. 1 illustrates an example of a packet reorder buffer according to one embodiment of the present invention.

FIG. 1 illustrates an example of a packet reorder buffer 100 according to one embodiment of the present invention. Packet reorder buffer 100 includes 'n' locations, locations 105(1)–(n). Packet reorder buffer 100 can be implemented in any storage technology (e.g., dynamic random access memory (DRAM), static random memory (SRAM), or the like). Each buffer location can be further configured into three fields. It will be apparent to one of the skill in the art that, while specific fields are described, the buffer locations can be configured into any appropriate number of fields. A status field 110(X) defines the status of location 105(X) or the status of a packet stored in location 105(X). X can be any number from 0–n. The length of status field 110(X) can be configured according to a number of states defined for location 105(X). For illustration purpose, in the present example, the length of status field 110(X) is configured to represents states 'empty', 'ready' and 'not-ready'. However, any number of states for location X can be defined to represent the status of location 105(X) and the data stored therein (e.g., intermediate states like writing, reading, forwarding or the like). At initialization, status field 110(X) depicts a code representing that the buffer location 105(X) is 'empty'. A packet field 130 (X) stores incoming packets. The length of packet field 130(X) can be determined according to a size of incoming packet defined by the communication protocol employed by the router. A hash field 130(X) stores a hash value for the incoming packet stored at packet field 120(X) in location 105(X). The hash value can be determined according to a number of methods known in the art. In this example, for illustration purpose, the hash value is determined based on the destination address of the incoming packets. However, the hash value can be determined using a number of parameters (such as, for example, source address, incoming port, type of protocol used and the like or combination thereof).

The size of packet reorder buffer 100 can be configured according to a number of factors (e.g., storage resources available in a router, size of incoming packets, size of hash value chosen, number of packet states defined and the like). When a packet arrives at the router, the router stores the packet at location 105(X). The router then calculates a hash value for the destination address of the incoming packet and stores the hash value in hash field 130(X). The router changes the status field 110(X) to indicate a 'not-ready' state. The router then looks up the routing for the packet in a cache or a lookup table. After the lookup process is completed, the packet is then ready to be forwarded. Once the routing is determined, the router changes the status field 110(X) to indicate a 'ready' state. A head-of-line (HOL) pointer 140 points to a packet that is stored for the longest period of time in packet reorder buffer 100. HOL pointer 140 can be configured using any memory management scheme (i.e., e.g., software vectors, memory controllers stand alone controllers or the like or combination thereof). The packet identified by HOL pointer 140 is referred to herein as the HOL packet. In the present example, initially when first packet arrives at the router, the first packet is stored in location 105(1). However, the first packet can be stored at any desired location in packet reorder buffer 100.

The first packet in packet reorder buffer 100 is the HOL packet. The HOL term used herein is relative with respect to the 'age' of a packet in packet reorder buffer 100. As the router processes incoming packets, packets are stored and removed from packet reorder buffer 100. The packet that is stored in packet reorder buffer 100 for the longest period of time is referred to herein as the HOL packet. As packets are removed from packet reorder buffer 100, HOL pointer 140 moves through packet reorder buffer 100 to point to the next 'oldest' packet in packet reorder buffer 100. Packet reorder buffer 100 can be configured, for example, as a circular buffer. Thus, when HOL pointer 140 initially points to location 105(1), the last location in packet reorder buffer is location 'n'. When HOL pointer 140 points to a location 105(X), where X is a location between 1 and 'n', the last location in packet reorder buffer 100 is location 105(X-1). However, any combination of memory management schemes can be used for packet reorder buffer 100 (e.g., assigning a tail pointer for the last location in the buffer, defining memory segment pointers, assigning page pointers and the like, or combination thereof).

Packet Reordering

Figure 2A:
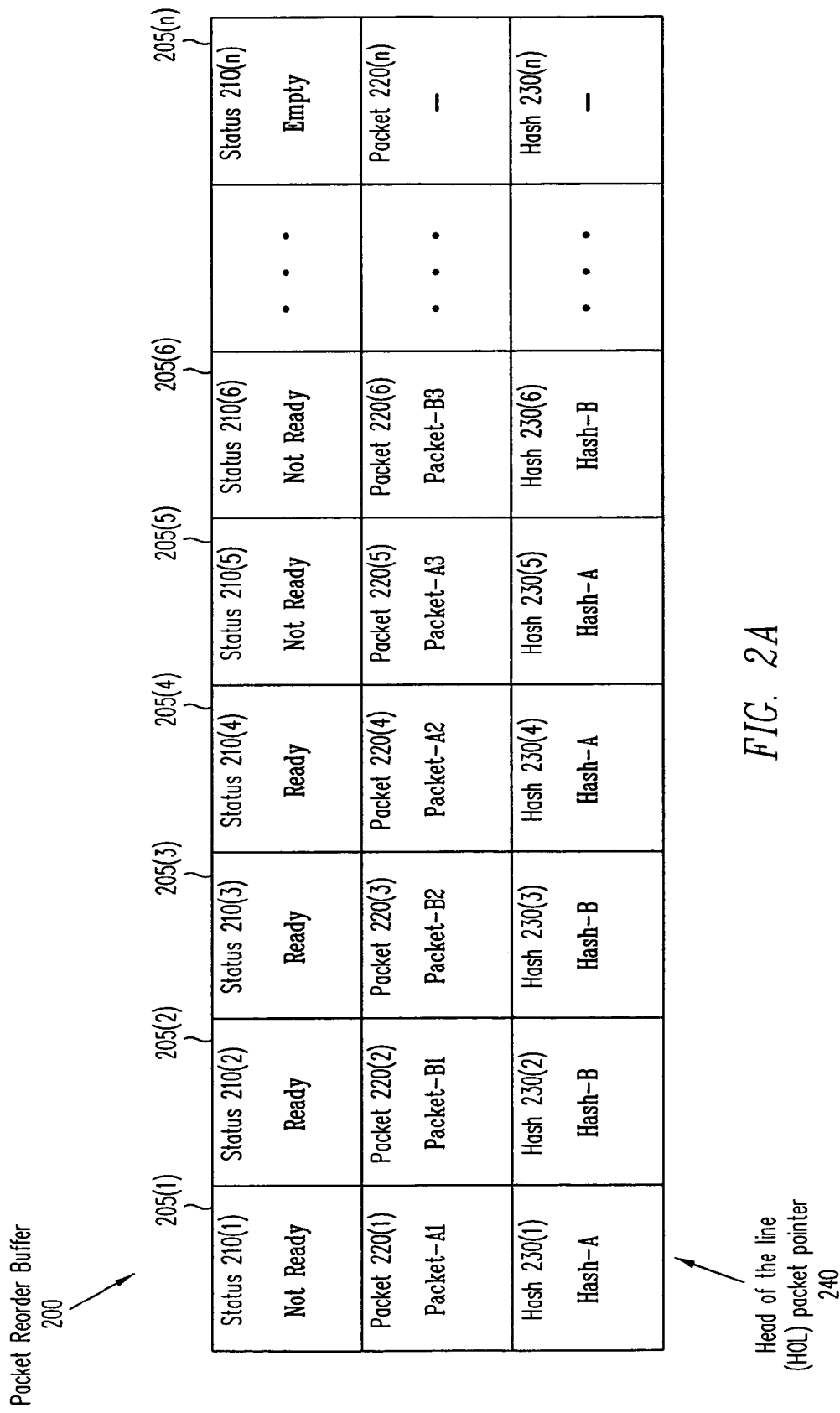
FIG. 2A illustrates an example of a packet reorder buffer with six incoming packets according to one embodiment of the present invention.

FIG. 2A illustrates an example of a packet reorder buffer 200, according to one embodiment of the present invention, with six incoming packets. Packet reorder buffer 200 includes a status field 210(X) to store the status of a packet stored at location 205(X). A packet field 220(X) stores incoming packet. A hash field 230(X) stores the hash value of the destination address of a packet stored at packet field 220(X). A router that includes packet reorder buffer 200 receives six packets. Packets A1–A3 belong to a common flow set 'A' and are destined to a common destination. Packets B1–B3 belong to a common flow set 'B' and are destined to a common destination. The router receives packets A1, B1, B2, A2, A3 and B3 in that order. Packet A1 is stored at packet field 220(1) in location 205(1), packet B1 is stored at packet field 220(2) in location 205(2) and so on. A hashed value of the destination of each packet is stored at a corresponding hash field 230(X). Because packets A1–A3 have a common destination, the hash value for each packet is Hash-A. Similarly, the hash value for packets B1–B3 is Hash-B. An HOL pointer 240 points to location 205(1), where the first packet, packet A1, is stored.

For purposes of illustration, in this example, packet A1 is a MPLS packet and the destination address of packet A1 is not cached. Packets B1–B3 are smaller IP packets, the destination addresses of which are cached. When the router receives packet A1, the router stores packet A1 in location 205(1) in packet reorder buffer 200 and sets the status field 210(1) for packet A1 to 'not-ready'. The router then first looks up the address of packet A1 in the cache. Because the address of packet A1 is not cached, the router proceeds to lookup in a routing lookup table. MPLS packets may require longer time to for lookup processing. While the router is processing packet A1, the router receives an IP packet, packet B1. The router stores packet B1 in location 205(2) in packet reorder buffer 200 and proceeds to lookup the routing for packet B1. The address of packet B1 is cached thus the router gets a cache hit and locates the routing information for packet B1. Packet B1 is ready to be processed for forwarding to the next hop. The router sets the status field 210(2) for packet B1 to 'ready'. Similarly, packet B2 gets a cache hit and is also ready for further processing, packet A2 is in the 'ready' state and packets A3 and B3 are the 'not-ready' state.

The router searches packet reorder buffer 200 for packets that are ready for further processing. Packet A1 is HOL packet and not ready thus the router cannot process packet A1. Packet B1 is ready. Packets A1 and B1 are from different flow sets. Packet B1 is the first packet in the sequence of Hash-B packets. Packet B1 is expected to arrive first at destination Hash-B. Thus, if packet B1 is forwarded before packet A1, there will not be an out-of-order network error at destination Hash-B. The router removes packet B1 from packet reorder buffer 200 and forwards packet B1 for further processing and forwarding to the next hop. Similarly, packet B2 can be processed after packet B1 and forwarded to the next hop. However, because packet B1 precedes packet B2 and both packets are destined for a common destination, packet B2 can not be processed before packet B1. Next, packet A2 is ready to be processed; however, packet A1 precedes packet A2 and is in the 'not-ready' state. Thus, packet A2 cannot be processed before packet A1. Packet A3 and packet B3 are in 'not-ready' and cannot be processed.

Figure 2B:
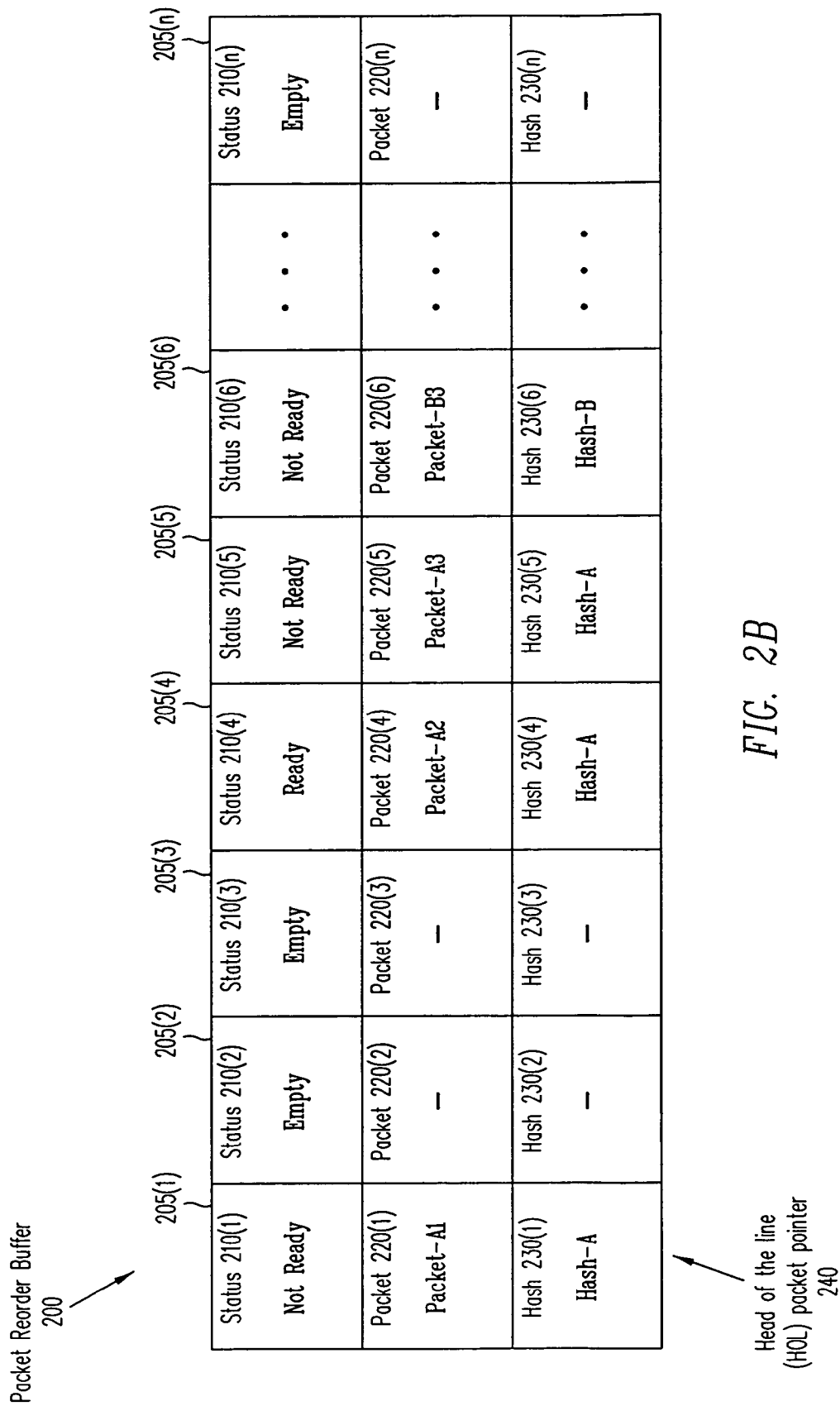
FIG. 2B illustrates an example of packet reorder buffer after two packets are processed out of order according to one embodiment of the present invention.

FIG. 2B illustrates an example of packet reorder buffer 200 after two packets are processed out of order according to one embodiment of the present invention. Location 1 stores packet A1 which is still in the 'not-ready' state. Locations 2 and 3 are now empty because packets B1 and B2 were processed out of order. Packet A2 is in the 'ready' state but cannot be processed because HOL packet A1 for flow set 'A' is not ready. Packets A3 and B3 are in the 'not-ready' states and waiting to be processed.

Finally, the lookup process for packet A1 is complete and packet A1 is ready to be processed. Packet B3 also becomes ready to be processed. The router processes packet A1 and immediately processes packet A2 because packet A2 is in the 'ready' state. Packet A3 is in the 'not-ready' state so the router cannot process packet A3. However, packet B3 has become ready. Because packet B3 does not belong to the same flow set as packet A3, packet B3 can be processed out-of-order with respect to packet A3. The router processes packet B3 and forwards packet B3 to the next hop.

Figure 2C:
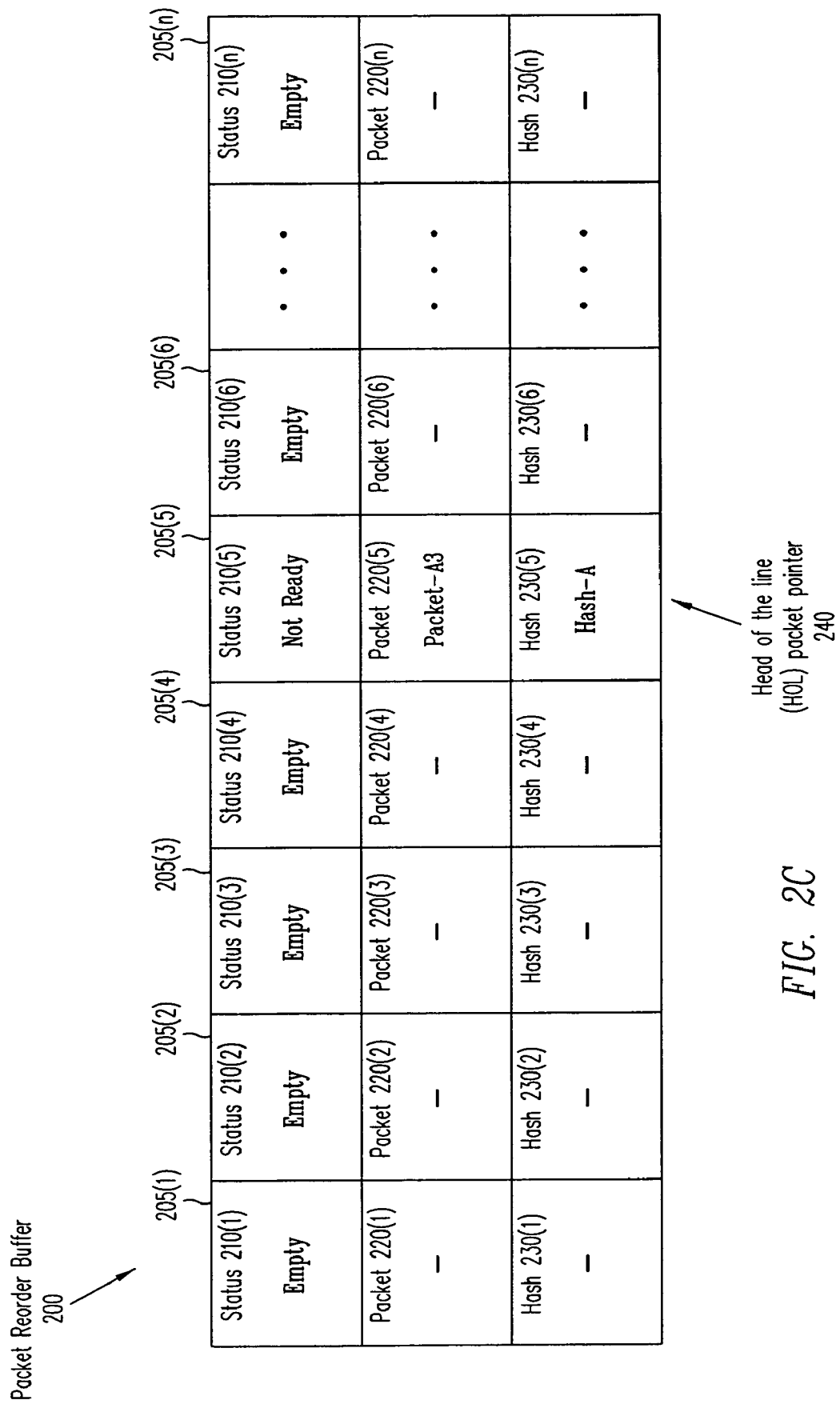
FIG. 2C illustrates an example of packet reorder buffer after two more packets are processed according to one embodiment of the present invention.

FIG. 2C illustrates an example of packet reorder buffer 200 after two more packets are processed according to one embodiment of the present invention. Locations 1–4 and 6 are empty. Packet A3 is in the 'not-ready' state. Because packet A3 is now the 'oldest' packet in packet reorder buffer 200, HOL packet pointer 240 points to packet A3 as the HOL packet. Conventionally, the router would not have processed any packet until packet A1 became ready for processing. According to embodiments of the present invention, packets from different flow sets can be processed out-of-order when the packets are ready to be processed in packet reorder buffer 200. Packets within a particular flow set are processed in order. Thus, incoming intra flow set packet order is maintained however, packets can be processed out-of-order with respect to incoming inter-flow set packet order.

Packet Reorder Buffer Management

In data networks, a router may receive many smaller IP packets that can be processed out-of-order relatively fast and forwarded to the next hop. For example, the router receives a MPLS packet that requires a lookup in the routing table, followed by a number of smaller IP packets with a cache hit. The router can process IP packets without waiting for completion of the lookup process for the MPLS packet provided that IP and MPLS packets belong to different flow sets. In the packet reorder buffer, the MPLS packet is the HOL packet. If there is a problem with the MPLS packet lookup, a situation can exist in which the router reaches the end of the packet reorder buffer while the lookup process for the MPLS packet is still in progress. To prevent such a situation, in one embodiment of the present invention, the router stops further processing of out-of-order packets if the number of packets processed ahead of HOL packet exceeds a predetermined threshold. The router asserts a back-pressure signal to stop receiving more packets from the network until the HOL packet is processed. According to an embodiment of the present invention, to release back-pressure, the HOL can be forwarded before the HOL is completely received (cut-through). The predetermined threshold can be determined based on a number of factors (such as, for example, the amount of memory allocated for the packet reorder buffer, rate of packet processing, internal processing delays, management scheme employed for the packet reorder buffer, amount of packets that can be received after the back-pressure signal is asserted and the like). In one embodiment of the present invention, the router can dynamically calculate the predetermined threshold based on resource needs.

Packet Reorder Buffer System

Figure 3:
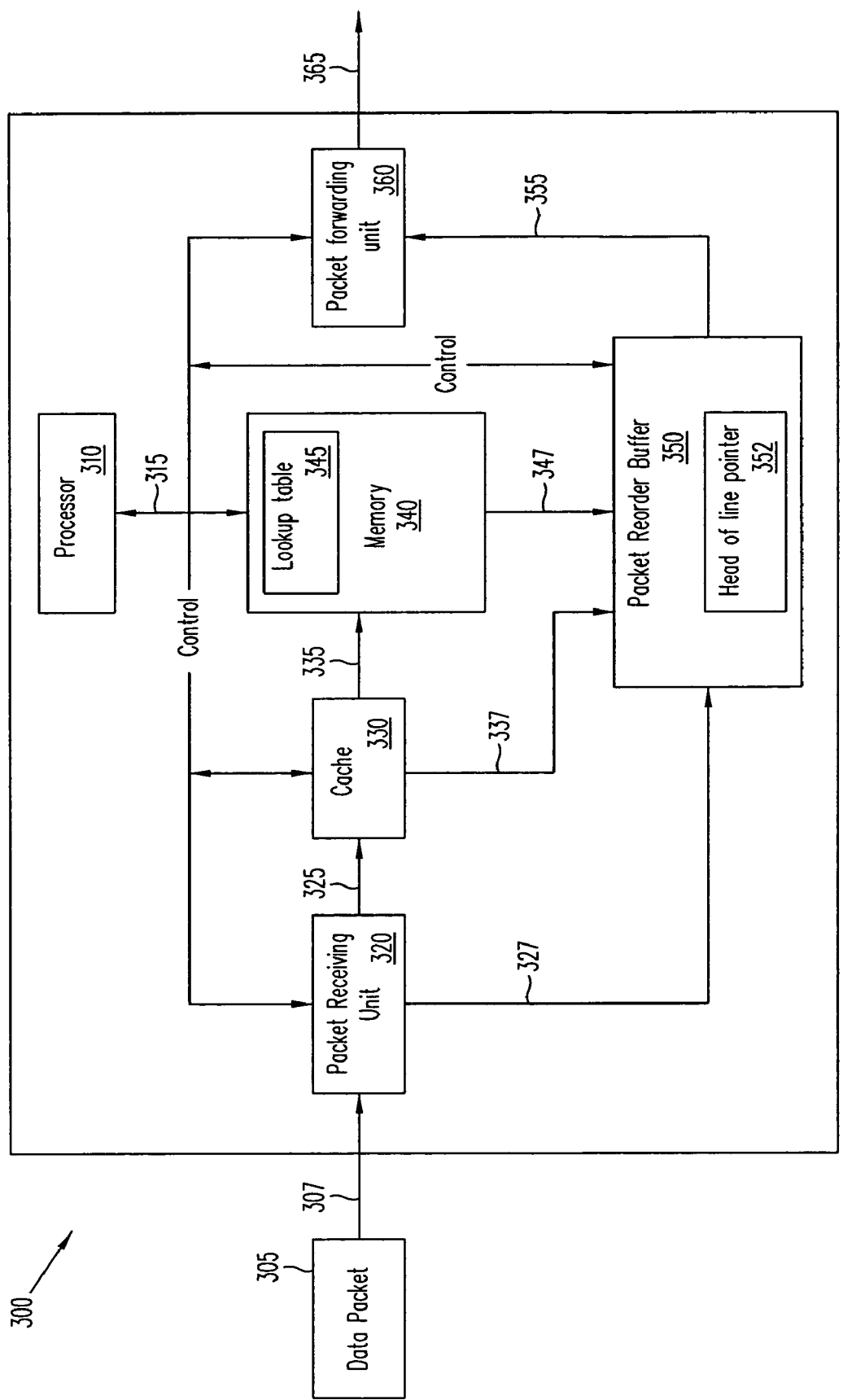
FIG. 3 is a flow chart illustrating the steps performed by a router when the router receives a packet according to one embodiment of the present invention.

FIG. 3 illustrates an example of a packet reorder buffer system ("system") 300 according to one embodiment of the present invention. System 300 includes a processor 310. Processor 310 is coupled to various elements of system 300 via a link 315. When system 300 receives a data packet (e.g., a data packet 305), system 300 stores data packet 305 in a packet receiving unit 320. Packet receiving unit 320 is coupled to a cache 330 via a link 325 and a packet reorder buffer 350 via a link 327. Processor 310 calculates a hash value for data packet 305 and stores the hash value and the data portion of data packet 305 in packet reorder buffer 350. Cache 330 stores the routing information for frequently-encountered destinations. Cache 330 is coupled to a memory 340 via a link 335 and to a packet reorder buffer 350 via a link 337. Memory 340 includes a lookup table 345. Lookup table 345 stores routing information for destinations in the network. Memory 340 is coupled to packet reorder buffer 350 via a link 347.

Packet reorder buffer 350 includes a head-of-line (HOL) pointer 352. HOL pointer 352 points to a packet that is stored for the longest period of time in packet reorder buffer 350. HOL pointer 352 can be configured using any memory management scheme (i.e., e.g., software vectors, memory processors, stand alone processors or the like or combination thereof). Packet reorder buffer 350 is coupled to a packet-forwarding unit 360 via a link 355. When the route lookup process of data packet 305 is completed, system 300 forwards data packet 305 to packet forwarding unit 360. After completing forwarding process for data packet 305, packet forwarding unit 360 forwards packet 305 on an output link 365. In the present example, for illustration purposes, individual links are described, however it will be apparent to one skilled in the art that these links can be configured using various transport techniques (i.e., e.g., multiplexed links, two-way links or the like).

Packet Reorder Buffer Processing

Figure 4:
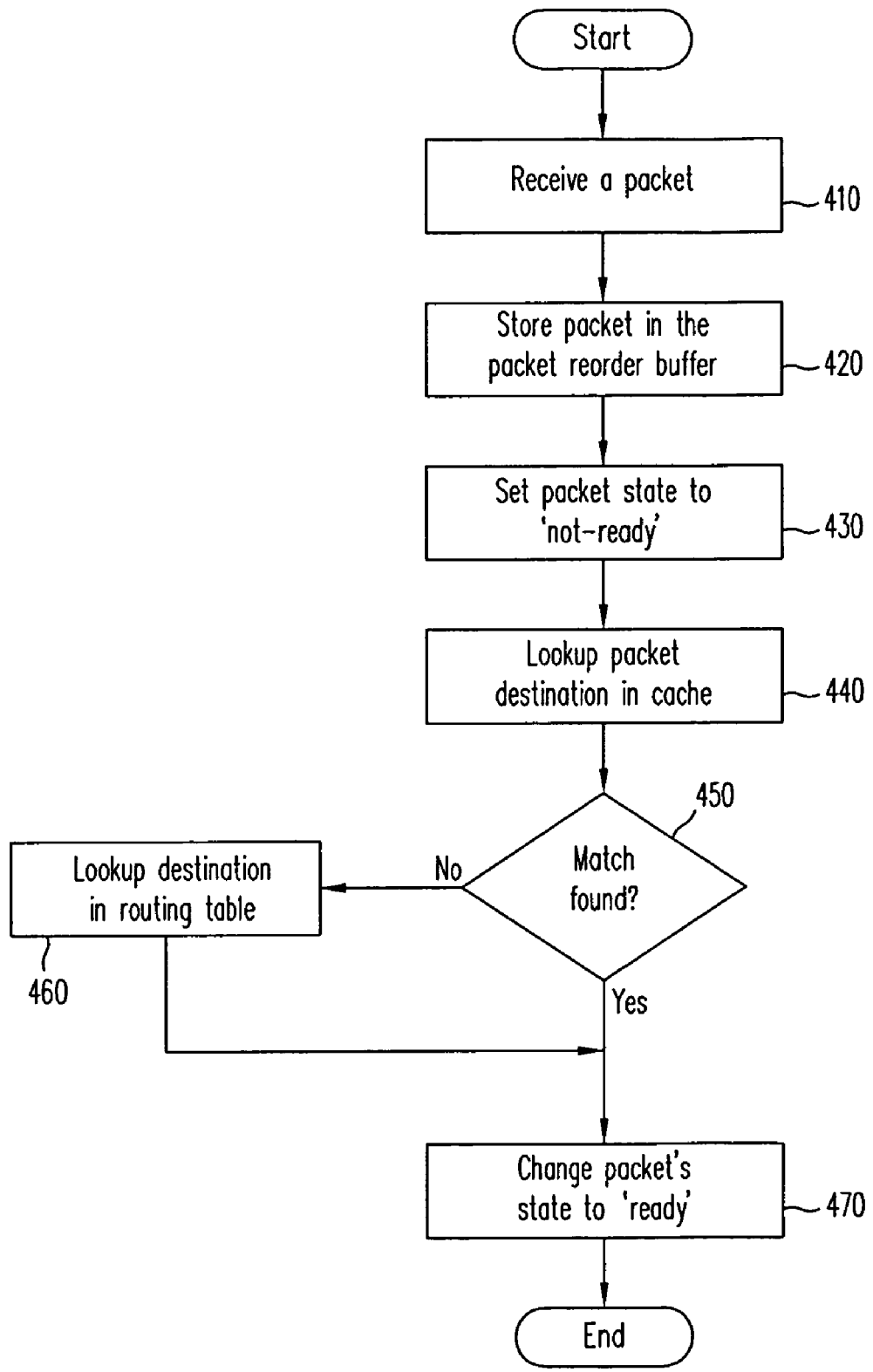
FIG. 4 is a flow chart illustrating the steps performed by a router during the processing of packets from a packet reorder buffer according to one embodiment of the present invention.

FIG. 4 is a flow chart illustrating the steps performed by a router when the router receives a packet, according to one embodiment of the present invention. Initially, the router receives a packet (step 410). The router stores the packet in a packet reorder buffer (step 420). The router sets the state of the packet to 'not-ready' (step 430). The router looks up the destination information for the packet in the a route cache (step 440). The router determines if a match for packet's destination is found in the cache (step 450). If a match was not found in the cache, the router proceeds to lookup the destination in the routing table (step 460). When a match is found in either the cache or the routing table, the router changes packet's state to 'ready' (step 470).

Figure 5:
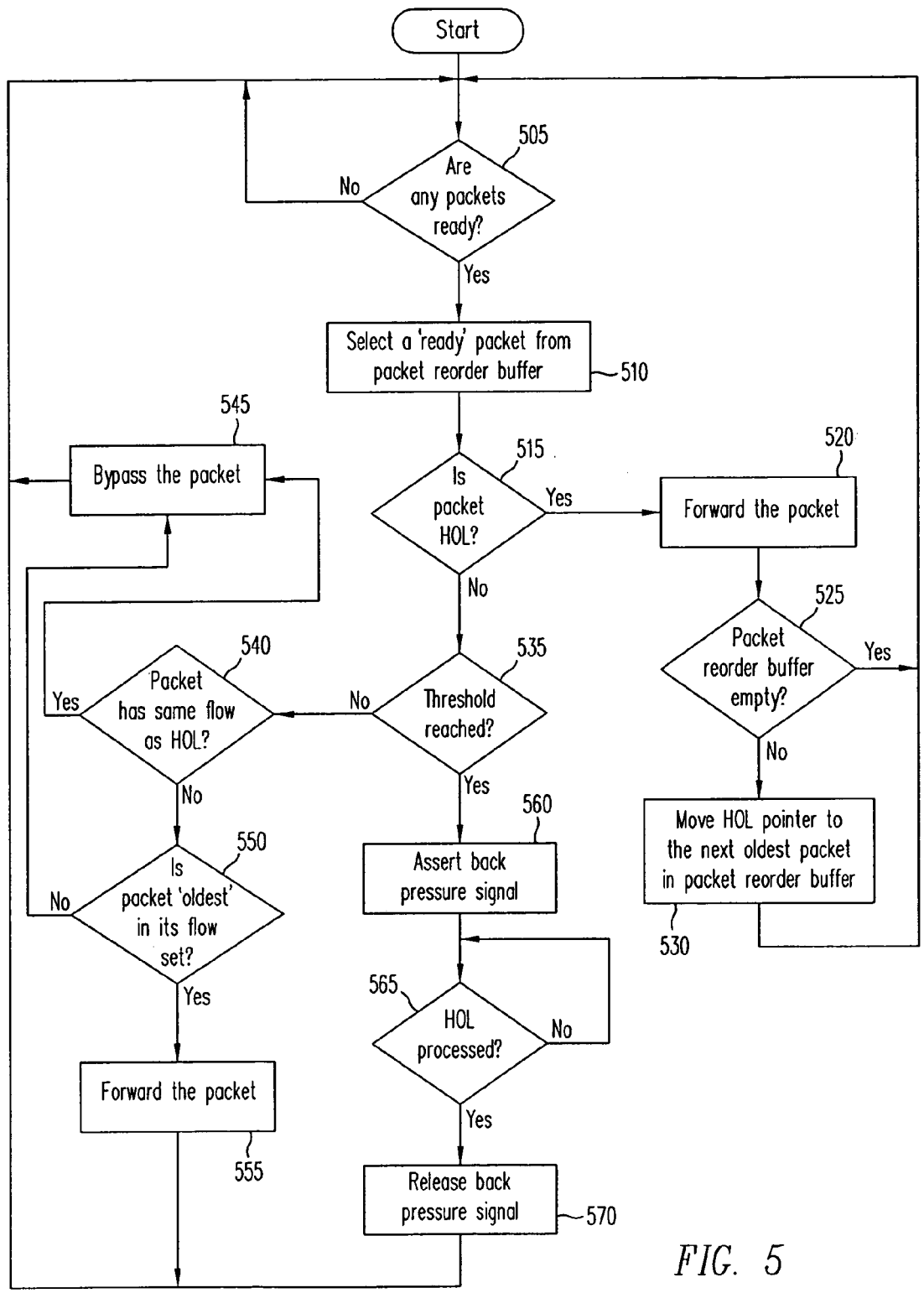
FIG. 5 illustrates an example of a packet reorder buffer system according to one embodiment of the present invention.

FIG. 5 is a flow chart illustrating the steps performed by a router during the processing of packets from a packet reorder buffer according to one embodiment of the present invention. Initially, the router determines if a packet in the packet reorder buffer is in the 'ready' state (step 405). If there are not 'ready' packets in the packet reorder buffer, the router continues to wait until a 'ready' packet is available in the packet reorder buffer. When a packet with 'ready' state is available in the packet reorder buffer, the router selects the packet that is in the 'ready' state from the packet reorder buffer (step 510).

The router then determines if the selected packet is a HOL packet (step 415). If the selected packet is an HOL packet, the router forwards the packet for further processing (step 520). Next, the router determines if the packet reorder buffer is empty (step 525). If the packet reorder buffer is empty, all the packets in the packet reorder buffer have been processed. If the packet reorder buffer is not empty, the router moves the HOL pointer to the next 'oldest' packet in the packet reorder buffer (step 530). The router proceeds to determine if a packet in the 'ready' state is available in the packet reorder buffer (step 505). If the selected packet is not a HOL packet, the router determines if a predetermined threshold of packet reorder processing has been reached (step 535). If the predetermined threshold of packet reorder processing has not been reached, the router determines if the selected packet belongs to the same flow set as the HOL packet (step 540). Packets in a flow set are processed in the order the router receives them. If the selected packet belongs to the same flow set as the HOL packet, the selected packet cannot be processed until the HOL packet is processed. The router bypasses the selected packet (step 545). The router proceeds to determine if a packet in the 'ready' state is available in the packet reorder buffer (step 505).

If the selected packet is not from the same flow set as the HOL packet, the router determines if the selected packet is the 'oldest' packet in its flow set in the packet reorder buffer (step 550). 'Oldest' packet is the packet that has been in the packet reorder buffer for the longest period of time relative to other packets within the same flow set. Typically, the router does not process packets out of order within a flow set. If the selected packet is not the 'oldest' packet in its flow set in the packet reorder buffer, the router bypasses the packet (step 545).

The router proceeds to determine if a packet in the 'ready' state is available in the packet reorder buffer (step 505). If the selected packet is the 'oldest' packet within its flow set, the router forwards selected packet for further processing (step 555). The router proceeds to determine if a packet in the 'ready' state is available in the packet reorder buffer (step 505). If the predetermined threshold of packet reorder processing has been reached, the router asserts a back-pressure signal to stop receiving incoming packets (step 560). The router thus stops packet processing until the HOL packet is processed. The router then determines if the HOL packet has been processed (step 565). The router continues to monitor the HOL packet processing. When the HOL packet is processed, the router releases the back-pressure signal to start receiving more packets (step 570). The router resumes packet processing by proceeding to determine if a packet in the 'ready' state is available in the packet reorder buffer (step 505).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method for routing packets in a router, the method comprising:
   receiving a plurality of packets in a first order;
   storing said plurality of packets in a packet reorder buffer;
   forwarding said plurality of packets in a second order from said packet reorder buffer;
   determining a plurality of hash values using information contained in said plurality of packets;
   storing said plurality of hash values in said packet reorder buffer; and
   using said plurality of hash values to determine said second order.

2. The method of claim 1, wherein a first subset of said plurality of packets having a common hash value is forwarded in an order in which said first subset is received by said router.

3. The method of claim 1, wherein said hash value is determined using a destination address of said plurality of packets.

4. The method of claim 1, wherein said hash value is determined using a source address of said plurality of packets.

5. The method of claim 1, wherein said hash value is determined using a protocol used by said plurality of packet.

6. The method of claim 1, wherein said hash value is determined using an address of at least one incoming port used by said plurality of packets.

7. The method of claim 1, wherein said hash value is determined using an address of at least one outgoing port used by said plurality of packets.

8. The method of claim 7, further comprising:
   selecting a 'head of line' packet from said packet reorder buffer, said 'head of line' packet is a packet that is stored in said packet reorder buffer for longest period of time; and
   identifying said 'head of line' packet using a 'head of line' pointer.

9. The method of claim 8, wherein said 'head of line' pointer is a software based pointer.

10. The method of claim 8, wherein said 'head of line' pointer is a hardware-based pointer.

11. The method of claim 8, further comprising:
    locating a routing information for said plurality of packets in a cache;
    if said routing information is not located in said cache, locating said routing information in a lookup table; and
    when said routing information is located, setting said status of said plurality of packets in said packet reorder buffer to 'ready'.

12. The method of claim 11, further comprising:
    selecting a first packet with a 'ready' status from said packet reorder buffer;
    determining whether said first packet is 'head of line' packet.

13. The method of claim 12, further comprising:
    if said first packet is 'head of line' packet,
       removing said first packet from said packet reorder buffer,
       forwarding said first packet, and
       if said packet reorder buffer is not empty,
          moving said 'head of line' pointer to one of said plurality of packets that is stored for longest period of time in said packet reorder buffer.

14. The method of claim 13, further comprising:
    if said first packet is not said 'head of line' packet,
       locating said 'head of line' packet in said packet reorder buffer,
       determining whether said first packet and said 'head of line' packet have a common hash value, and
       if said first packet and said 'head of line' packet have a common hash value,
          selecting a second packet with a 'ready' status from said packet reorder buffer.

15. The method of claim 14, further comprising:
    if said first packet and said 'head of line' packet do not have a common hash value,
       identifying a second subset of said plurality of packets having a common hash value with said first packet from said packet reorder buffer,
       determining whether said first packet is stored for longest period of time in said packet reorder buffer among said second subset of said plurality of packets, and
       if said first packet is not stored for longest period of time in said packet reorder buffer among said second subset of said plurality of packets,
          selecting a third packet with a 'ready' status from said packet reorder buffer.

16. The method of claim 15, further comprising:
    if said first packet is stored for longest period of time among said second subset of said plurality of packets in said packet reorder buffer,
       determining whether a predetermined number of packets have been forwarded ahead of said 'head of line' packet from said packet reorder buffer.

17. The method of claim 16, further comprising:
    if a predetermined number of packets have not been forwarded ahead of said 'head of line' packet from said packet reorder buffer, forwarding said first packet.

18. The method of claim 17, further comprising:
    if said predetermined number of packets have been forwarded ahead of said 'head of line' packet from said packet reorder buffer,
       generating an error, and
       waiting until said 'head of line' packet is forwarded.

19. The method of claim 18, wherein said head-of-line packet is forwarded before said routing information for said 'head of line' packet is located.

20. The method of claim 16, wherein said predetermined threshold is defined during a provisioning of said router.

21. The method of claim 16, wherein said predetermined threshold is dynamically calculated by said router.

22. The method of claim 1, further comprising:
    setting a status of said plurality of packets in said packet reorder buffer to 'not-ready'.

23. A network element comprising:
    a processor; said processor is configured to receive a plurality of incoming packets in a first order;
       separate said plurality of incoming packets into a plurality of subsets of incoming packets, wherein said plurality of incoming packets is separated according to
a plurality of characteristics of said plurality of incoming packets; and
forward said plurality of subsets of incoming packets in a second order.

24. The network element of claim 23, wherein incoming packets in each one of said plurality of subsets of incoming packets are forwarded in an order that the incoming packets are received.

25. The network element of claim 23, wherein one of said plurality of characteristics is a destination address of said plurality of incoming packets.

26. The network element of claim 23, wherein one of said plurality of characteristics is a source address of said plurality of incoming packets.

27. The network element of claim 23, wherein one of said plurality of characteristics is a protocol used by said plurality of incoming packets.

28. The network element of claim 23, wherein one of said plurality of characteristics is an address of at least one incoming port used by said plurality of incoming packets.

29. The network element of claim 23, wherein one of said plurality of characteristics is an address of at least one outgoing port used by said plurality of incoming packets.

30. A network element for routing packets in a router comprising:
means for receiving a plurality of packets in a first order;
means for storing said plurality of packets in a packet reorder buffer;
means for forwarding said plurality of packets in a second order from said packet reorder buffer;
means for determining a plurality of hash values using information contained in said plurality of packets;
means for storing said plurality of hash values in said packet reorder buffer; and
means for using said plurality of hash values to determine said second order.

31. The network element of claim 30, wherein a first subset of said plurality of packets having a common hash value is forwarded in an order in which said first subset is received by said router.

32. The network element of claim 30, wherein said hash value is determined using a destination address of said plurality of packets.

33. The network element of claim 30, wherein said hash value is determined using a source address of said plurality of packets.

34. The network element of claim 30, wherein said hash value is determined using a protocol used by said plurality of packet.

35. The network element of claim 30, wherein said hash value is determined using an address of at least one incoming port used by said plurality of packets.

36. The network element of claim 30, wherein said hash value is determined using an address of at least one outgoing port used by said plurality of packets.

37. The network element of claim 36, further comprising:
means for selecting a 'head of line' packet from said packet reorder buffer, said 'head of line' packet is a packet that is stored in said packet reorder buffer for longest period of time; and
means for identifying said 'head of line' packet using a 'head of line' pointer.

38. The network element of claim 37, wherein said 'head of line' pointer is a software based pointer.

39. The network element of claim 37, wherein said 'head of line' pointer is a hardware-based pointer.

40. The network element of claim 37, further comprising:
means for locating a routing information for said plurality of packets in a cache;
means for locating said routing information in a lookup table if said routing information is not located in said cache; and
means for setting said status of said plurality of packets in said packet reorder buffer to 'ready' when said routing information is located.

41. The network element of claim 40, further comprising:
means for selecting a first packet with a 'ready' status from said packet reorder buffer;
means for determining whether said first packet is 'head of line' packet.

42. The network element of claim 41, further comprising:
means for removing said first packet from said packet reorder buffer if said first packet is 'head of line' packet;
means for forwarding said first packet if said first packet is 'head of line' packet if said first packet is 'head of line' packet; and
means for moving said 'head of line' pointer to one of said plurality of packets that is stored for longest period of time in said packet reorder buffer if said packet reorder buffer is not empty.

43. The network element of claim 42, further comprising:
means for locating said 'head of line' packet in said packet reorder buffer if said first packet is not said 'head of line' packet;
means for determining whether said first packet and said 'head of line' packet have a common hash value if said first packet is not said 'head of line' packet; and
means for selecting a second packet with a 'ready' status from said packet reorder buffer if said first packet and said 'head of line' packet have a common hash value.

44. The network element of claim 43, further comprising:
means for identifying a second subset of said plurality of packets having a common hash value with said first packet from said packet reorder buffer if said first packet and said 'head of line' packet do not have a common hash value;
means for determining whether said first packet is stored for longest period of time in said packet reorder buffer among said second subset of said plurality of packets if said first packet and said 'head of line' packet do not have a common hash value; and
means for selecting a third packet with a 'ready' status from said packet reorder buffer if said first packet is not stored for longest period of time in said packet reorder buffer among said second subset of said plurality of packets.

45. The network element of claim 44, further comprising:
means for determining whether a predetermined number of packets have been forwarded ahead of said 'head of line' packet from said packet reorder buffer if said first packet is stored for longest period of time among said second subset of said plurality of packets in said packet reorder buffer.

46. The network element of claim 45, further comprising:
means for means for forwarding said first packet if a predetermined number of packets have not been forwarded ahead of said 'head of line' packet from said packet reorder buffer.

47. The network element of claim 46, further comprising:
means for generating an error if said predetermined number of packets have been forwarded ahead of said 'head of line' packet from said packet reorder buffer, and
means for waiting until said 'head of line' packet is forwarded if said predetermined number of packets have been forwarded ahead of said 'head of line' packet from said packet reorder buffer.

48. The network element of claim 45, wherein said predetermined threshold is defined during a provisioning of said router.

49. The network element of claim 45, wherein said predetermined threshold is dynamically calculated by said router.

50. The network element of claim 30, further comprising:
means for setting a status of said plurality of packets in said packet reorder buffer to 'not-ready'.

51. A computer readable medium comprising a set of instructions executable on a computer system, wherein said set of instructions is configured to:
receive a plurality of packets in a first order;
store said plurality of packets in a packet reorder buffer;
forward said plurality of packets in a second order from said packet reorder buffer;
determine a plurality of hash values using information contained in said plurality of packets;
store said plurality of hash values in said packet reorder buffer; and
use said plurality of hash values to determine said second order.

52. The computer readable medium of claim 51, wherein a first subset of said plurality of packets having a common hash value is forwarded in an order in which said first subset is received by said router.

53. The computer readable medium of claim 51 wherein said hash value is determined using a destination address of said plurality of packets.

54. The computer readable medium of claim 51, wherein said hash value is determined using a source address of said plurality of packets.

55. The computer readable medium of claim 51, wherein said hash value is determined using a protocol used by said plurality of packet.

56. The computer readable medium of claim 51, wherein said hash value is determined using an address of at least one incoming port used by said plurality of packets.

57. The computer readable medium of claim 51, wherein said hash value is determined using an address of at least one outgoing port used by said plurality of packets.

58. The computer readable medium of claim 57, wherein said set of instructions is further configured to
select a 'head of line' packet from said packet reorder buffer, said 'head of line' packet is a packet that is stored in said packet reorder buffer for longest period of time; and
identify said 'head of line' packet using a 'head of line' pointer.

59. The computer readable medium of claim 58, wherein said 'head of line' pointer is a software based pointer.

60. The computer readable medium of claim 58, wherein said 'head of line' pointer is a hardware-based pointer.

61. The computer readable medium of claim 58, wherein said set of instructions is further configured to:
locate a routing information for said plurality of packets in a cache;
if said routing information is not located in said cache, locate said routing information in a lookup table; and
when said routing information is located, set said status of said plurality of packets in said packet reorder buffer to 'ready'.

62. The computer readable medium of claim 61, wherein said set of instructions is further configured to
select a first packet with a 'ready' status from said packet reorder buffer;
determine whether said first packet is 'head of line' packet.

63. The computer readable medium program product of claim 62, wherein said set of instructions is further configured to:
if said first packet is 'head of line' packet,
remove said first packet from said packet reorder buffer,
forward said first packet, and
if said packet reorder buffer is not empty,
move said 'head of line' pointer to one of said plurality of packets that is stored for longest period of time in said packet reorder buffer.

64. The computer readable medium of claim 63, wherein said set of instructions is further configured to:
if said first packet is not said 'head of line' packet, locate said 'head of line' packet in said packet reorder buffer, determine whether said first packet and said 'head of line' packet have a common hash value, and
if said first packet and said 'head of line' packet have a common hash value,
select a second packet with a 'ready' status from said packet reorder buffer.

65. The computer readable medium of claim 64, wherein said set of instructions is further configured to
if said first packet and said 'head of line' packet do not have a common hash value,
identify a second subset of said plurality of packets having a common hash value with said first packet from said packet reorder buffer,
determine whether said first packet is stored for longest period of time in said packet reorder buffer among said second subset of said plurality of packets, and
if said first packet is not stored for longest period of time in said packet reorder buffer among said second subset of said plurality of packets,
select a third packet with a 'ready' status from said packet reorder buffer.

66. The computer readable medium of claim 65, wherein said set of instructions is further configured to
if said first packet is stored for longest period of time among said second subset of said plurality of packets in said packet reorder buffer,
determine whether a predetermined number of packets have been forwarded ahead of said 'head of line' packet from said packet reorder buffer.

67. The computer readable medium of claim 66, wherein said set of instructions is further configured to:
if a predetermined number of packets have not been forwarded ahead of said 'head of line' packet from said packet reorder buffer, forward said first packet.

68. The computer readable medium of claim 67, wherein said set of instructions is further configured to
if said predetermined number of packets have been forwarded ahead of said 'head of line' packet from said packet reorder buffer, generate an error, and
wait until said 'head of line' packet is forwarded.

69. The computer readable medium of claim 66, wherein said predetermined threshold is defined during a provisioning of said router.

70. The computer readable medium of claim 66, wherein said predetermined threshold is dynamically calculated by said router.

71. The computer readable medium of claim 51, wherein said set of instructions is further configured to
set a status of said plurality of packets in said packet reorder buffer to 'not-ready'.

\* \* \* \* \*